(12) United States Patent
Baker et al.

(10) Patent No.: US 12,478,746 B2
(45) Date of Patent: Nov. 25, 2025

(54) DEVICE AND METHOD FOR INTRAVENOUS FLUID WARMING

(71) Applicant: Eli Lilly and Company, Indianapolis, IN (US)

(72) Inventors: Alexander Joseph Baker, Cambridge, MA (US); Yan Liao, Zionsville, IN (US); Candace Jean Scherer, Indianapolis, IN (US)

(73) Assignee: Eli Lilly and Company, Indianapolis, IN (US)

( * ) Notice: Subject to any disclaimer, the term of this patent is extended or adjusted under 35 U.S.C. 154(b) by 1084 days.

(21) Appl. No.: 17/602,477

(22) PCT Filed: Apr. 30, 2020

(86) PCT No.: PCT/US2020/030591
§ 371 (c)(1),
(2) Date: Oct. 8, 2021

(87) PCT Pub. No.: WO2020/226982
PCT Pub. Date: Nov. 12, 2020

(65) Prior Publication Data
US 2022/0203047 A1    Jun. 30, 2022

Related U.S. Application Data

(60) Provisional application No. 62/844,229, filed on May 7, 2019.

(51) Int. Cl.
*A61M 5/44*    (2006.01)

(52) U.S. Cl.
CPC ........... *A61M 5/44* (2013.01); *A61M 2205/36* (2013.01); *A61M 2205/3633* (2013.01); *A61M 2205/364* (2013.01); *A61M 2209/088* (2013.01)

(58) Field of Classification Search
CPC ............ A61M 5/1723; A61M 2202/07; A61M 2205/18; A61M 2205/3569;
(Continued)

(56) References Cited

U.S. PATENT DOCUMENTS

| 5,042,455 A | 8/1991 | Yue et al. |
| 5,250,032 A * | 10/1993 | Carter, Jr. ............... A61M 5/44 219/535 |

(Continued)

FOREIGN PATENT DOCUMENTS

| DE | 2515889 | 10/1976 |
| WO | 98/38953 | 9/1998 |

(Continued)

OTHER PUBLICATIONS

International Search Report of the International Searching Authority pertaining to International Application No. PCT/US2020/030591; Date of Mailing: Jul. 22, 2020; 6 pages.

(Continued)

*Primary Examiner* — Phillip A Gray
(74) *Attorney, Agent, or Firm* — Arthur Shum

(57) ABSTRACT

A system for warming intravenous fluids is provided including a positioning holder configured to receive and support a tube for providing at least one intravenous fluid to a patient and a plurality of elongate heating fingers, wherein each elongate heating finger is configured to be independently manipulated such that said elongate heating finger contacts the tube to transfer heat to the at least one intravenous fluid provided via the tube.

26 Claims, 8 Drawing Sheets

(58) Field of Classification Search
CPC ........ A61M 2205/50; A61M 2205/502; A61M 5/44; A61M 2205/36; A61M 2205/3633; A61M 2205/364; A61M 2209/088; G16H 20/17
USPC ........................................................ 604/507
See application file for complete search history.

(56) References Cited

U.S. PATENT DOCUMENTS

| | | |
|---|---|---|
| 6,601,576 B1 | 8/2003 | Baysinger, Jr. et al. |
| 6,788,885 B2 * | 9/2004 | Mitsunaga ............... A61M 5/44 604/113 |
| 7,094,219 B2 | 8/2006 | Noice et al. |
| 2009/0293859 A1 | 12/2009 | Coffey et al. |
| 2015/0045763 A1 | 2/2015 | Barone, Jr. et al. |

FOREIGN PATENT DOCUMENTS

| | | | |
|---|---|---|---|
| WO | 03/059414 | 7/2003 | |
| WO | 06/056015 | 6/2006 | |
| WO | WO-2006056015 A1 * | 6/2006 | ............... A61M 5/14 |

OTHER PUBLICATIONS

Written Opinion of the International Searching Authority pertaining to International Application No. PCT/US2020/030591; Date of Mailing: Jul. 22, 2020; 9 pages.
Brochure: "ivNow Modular Fluid Warmer Product Brochure".
Brochure: "VyAire Enflow IV Warmer Product Brochure".
Brochure: "iWarm Fluid Warmer Product Brochure".

* cited by examiner

US 12,478,746 B2

DEVICE AND METHOD FOR INTRAVENOUS FLUID WARMING

TECHNICAL FIELD

The present disclosure relates to medical devices and methods. More specifically, the present disclosure relates to medical devices and methods for warming fluids delivered to a patient.

BACKGROUND

The administration of cold intravenous fluids in medical settings may cause discomfort, stress, and anxiety of patients, largely owing to the inability to warm up during the infusion experience. Additionally, cold intravenous fluids can cause not only discomfort but also hypothermia for some patients, especially during surgery. Therefore, there is a need for devices and methods for warming intravenous fluids that are cost-effective, convenient, and comfortable. In certain applications, devices and methods for warming intravenous fluids while the fluids are being administered are particularly desirable.

SUMMARY

The embodiments provided herein relate to devices and methods for warming fluids delivered to a patient. Example embodiments include the following.

In some embodiments, a system for warming intravenous fluids comprises: a base having a first side and a second side; a positioning holder disposed on the second side and configured to receive and support a tube for providing at least one intravenous fluid to a patient; and a plurality of elongate heating fingers disposed on the second side, wherein each elongate heating finger of the plurality of elongate heating fingers is configured to be independently manipulated such that said elongate heating finger contacts the tube to transfer heat to the at least one intravenous fluid provided via the tube.

In some embodiments, a system for warming intravenous fluids comprises: a base configured to removably secure a tube, the tube providing at least one intravenous fluid to the patient; a first elongate heating finger movably coupled to the base; and a second elongate heating finger movably coupled to the base; wherein the system has: a neutral configuration in which the first and second elongate heating fingers are separated from the tube; a low-heat configuration in which the first elongate heating finger contacts the tube and the second elongate heating finger is separated or insulated from the tube; and a high-heat configuration in which the first and second elongate heating fingers contact the tube.

In some embodiments, a method of warming at least one fluid provided intravenously to a patient via a tube using a system including a base, a positioning holder, a plurality of elongate heating fingers, and at least one securing members, the method comprises: providing the plurality of elongate heating fingers; coupling the tube to the positioning holder; and individually manipulating one or more of the plurality of elongate heating fingers to contact the tube based on a target temperature of the at least one fluid.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above mentioned and other features of this present disclosure, and the manner of attaining them, will become more apparent and the invention itself will be better understood by reference to the following description of embodiments of the present disclosure taken in conjunction with the accompanying drawings, wherein.

Figure 1:
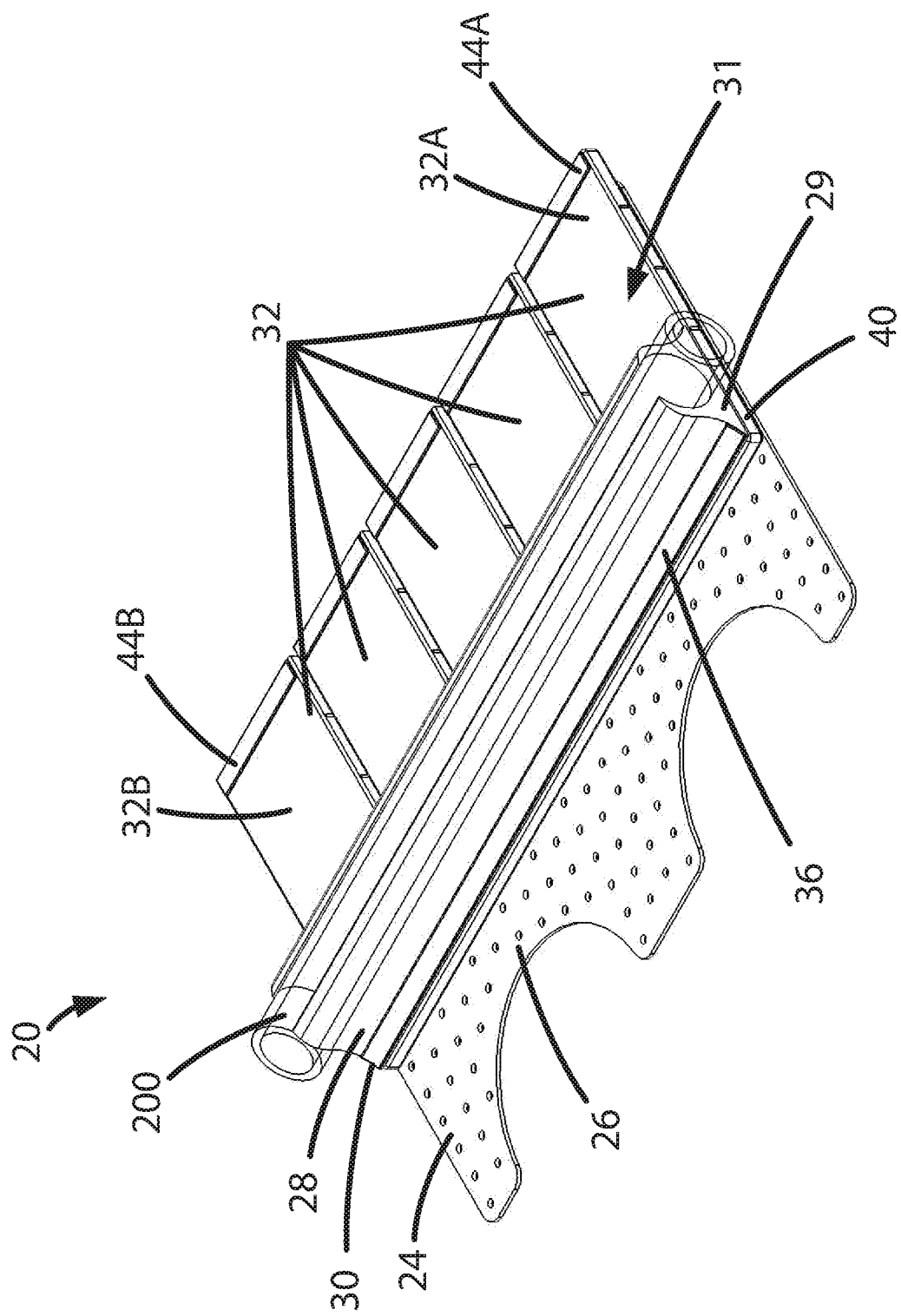
FIG. 1 is a perspective view of a warming system in a first configuration, in accordance with various embodiments.
Figure 2:
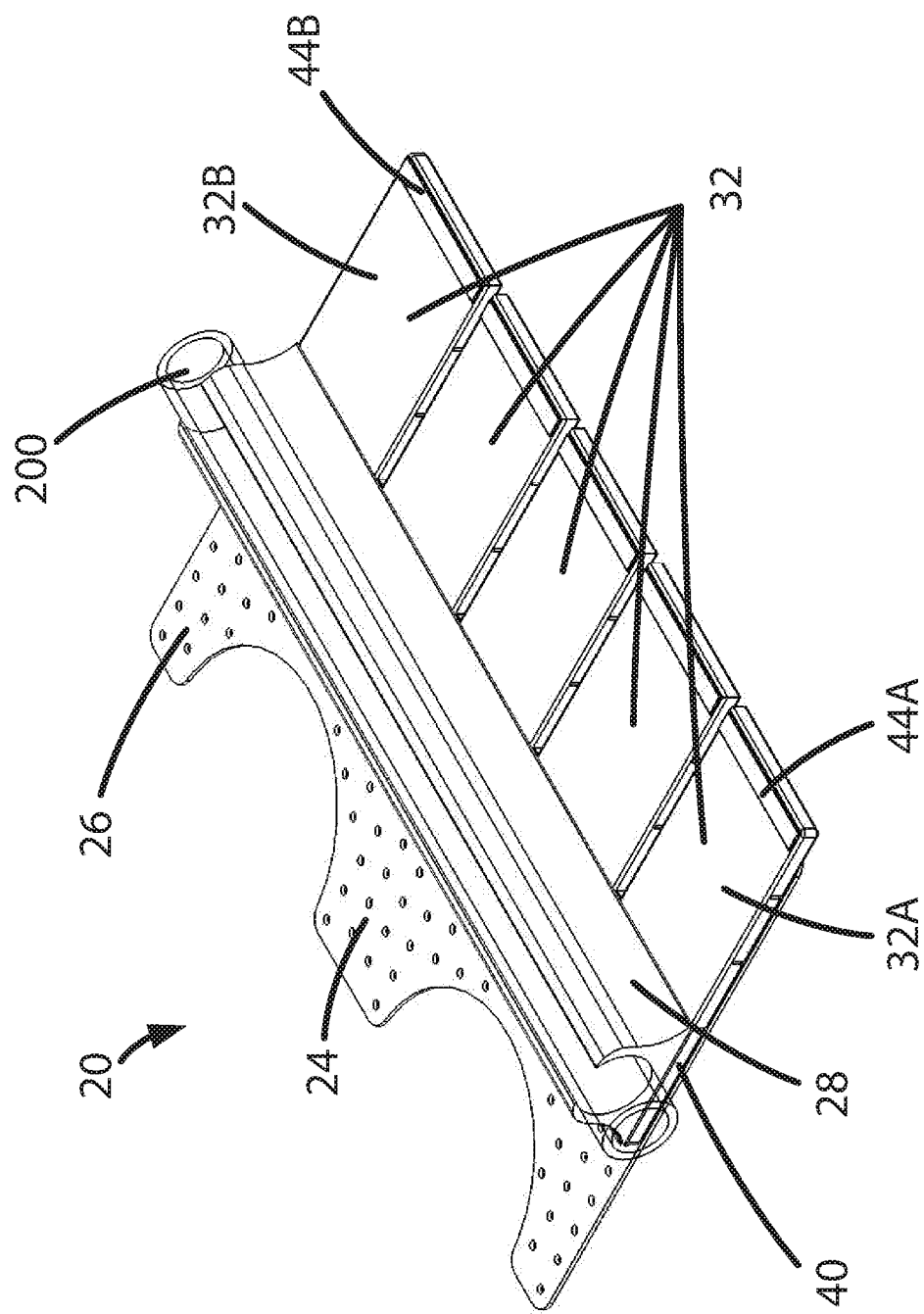
FIG. 2 is another perspective view of the warming system of FIG. 1, in accordance with various embodiments.

Corresponding reference characters indicate corresponding parts throughout the several views. Although the exemplification set out herein illustrates embodiments of the present disclosure, in several forms, the embodiments disclosed below are not intended to be exhaustive or to be construed as limiting the scope of the invention to the precise forms disclosed.

DETAILED DESCRIPTION

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

FIGS. 1-5 depict different views of a warming system 20, in accordance with various embodiments. The illustrated warming system 20 includes a base 24, a positioning holder 28, a plurality of elongate heating fingers 32, illustratively five elongate heating fingers 32, a securing member 36, and an insulating layer 40.

The illustrated base 24 has a first or lower side 25 and a second or upper side 26. The first side 25 of the base 24 may be configured to be removably or permanently coupled (e.g., adhesively coupled) to a mounting surface, such as a surface of an object (e.g., a table) or of a patient's skin or clothing. For example, the first side 25 of the base 24 may include a removable backing (not shown) that is peeled away before use to reveal an adhesive on the first side 25, similar to an adhesive bandage. In some embodiments, the base 24 may be air-permeable, such as being perforated with perforations 64 or other apertures (see FIG. 5) for improved breathability.

Figure 3:
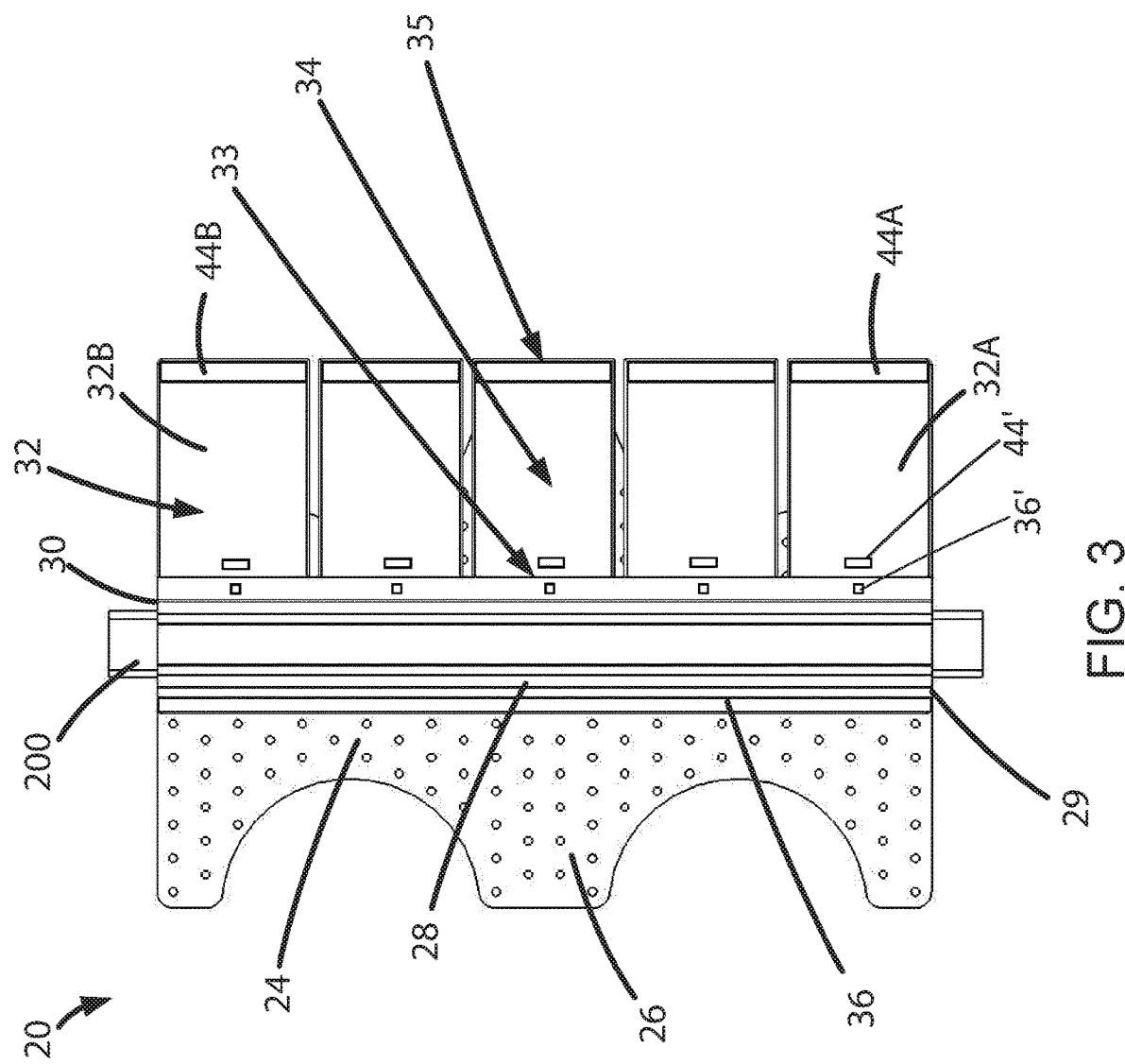
FIG. 3 is a top view of the warming system of FIG. 1, in accordance with various embodiments.
Figure 5:
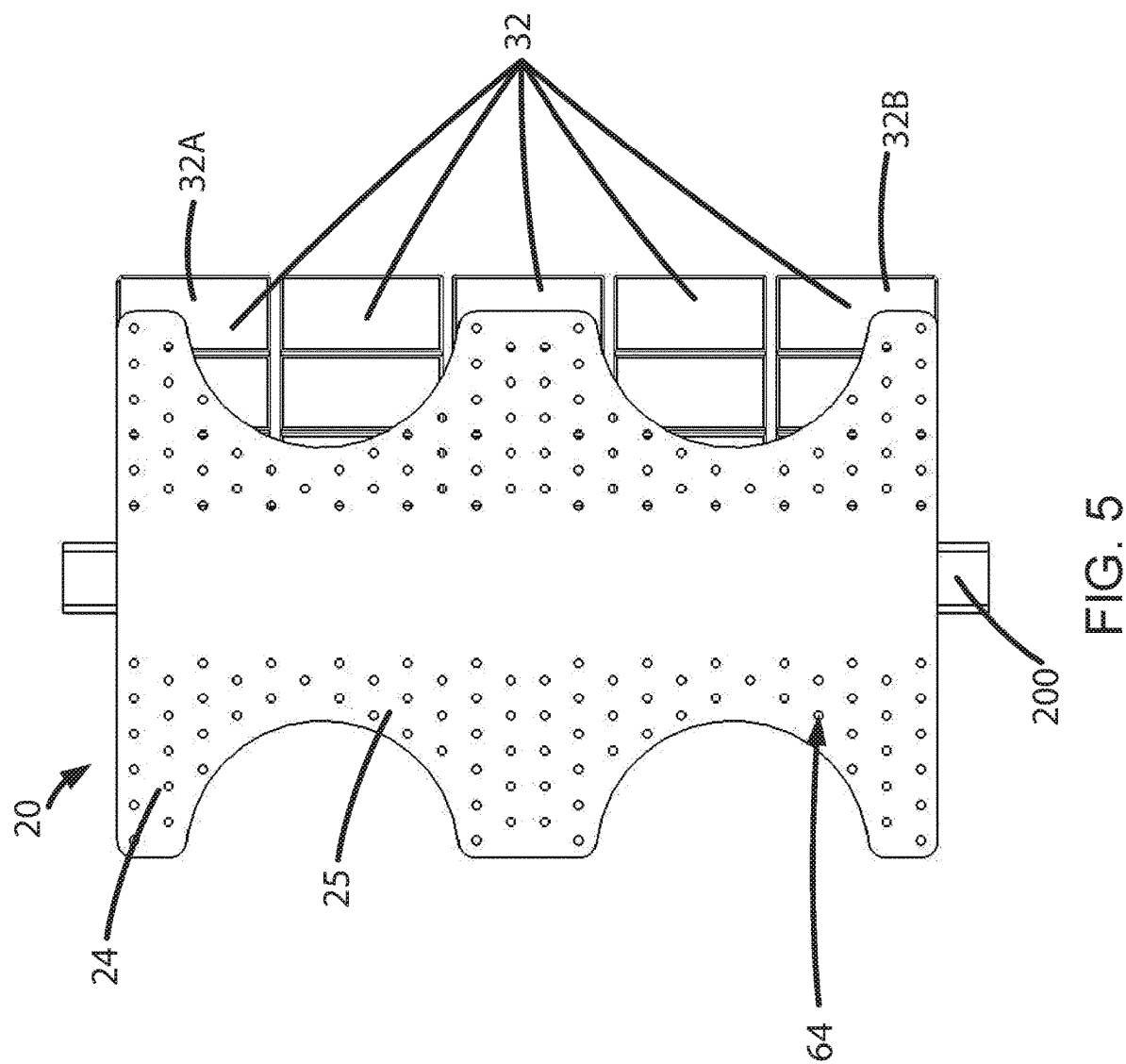
FIG. 5 is a bottom view of the warming system of FIG. 1, in accordance with various embodiments.

In some examples, the perforations 64 substantially cover regions away from a center or center-line of the base 24 beneath positioning holder 28 such that the base 24 is more air-permeable away from positioning holder 28 and less air-permeable beneath positioning holder 28, as illustrated in FIGS. 3 and 5. In certain embodiments, the base 24 is comprised of a flexible and/or stretchable material (e.g., fabric, polymer) that is configured to conform with and attach to the underlying mounting surface.

The illustrated positioning holder 28 is disposed on the base 24, specifically on the second side 26 of the base 24. As illustrated, the positioning holder 28 extends substantially (e.g., entirely) across the base 24, such as along a length of the base. In other embodiments, one or more short and discrete positioning holders 28 may be positioned along the base 24. In certain examples, the positioning holder 28 is positioned near a center or center-line of the base 24, but this position may vary. The positioning holder 28 is configured to receive, support, and/or secure a tube 200 for providing at least one intravenous fluid to a patient. The intravenous fluid may comprise a drug. The term "drug" refers to one or more therapeutic agents including but not limited to drugs for chemotherapy, insulins, insulin analogs such as insulin lispro or insulin glargine, insulin derivatives, GLP-1 receptor agonists such as dulaglutide or liraglutide, glucagon, glucagon analogs, glucagon derivatives, gastric inhibitory polypeptide (GIP), GIP analogs, GIP derivatives, oxyntomodulin analogs, oxyntomodulin derivatives, therapeutic antibodies and any therapeutic agent that is capable of delivery by tube 200. The drug as delivered by the tube may be formulated with one or more excipients. The warming system may be operated in a manner generally as described herein by a patient, caregiver or healthcare professional to deliver drug to a person.

Figure 4:
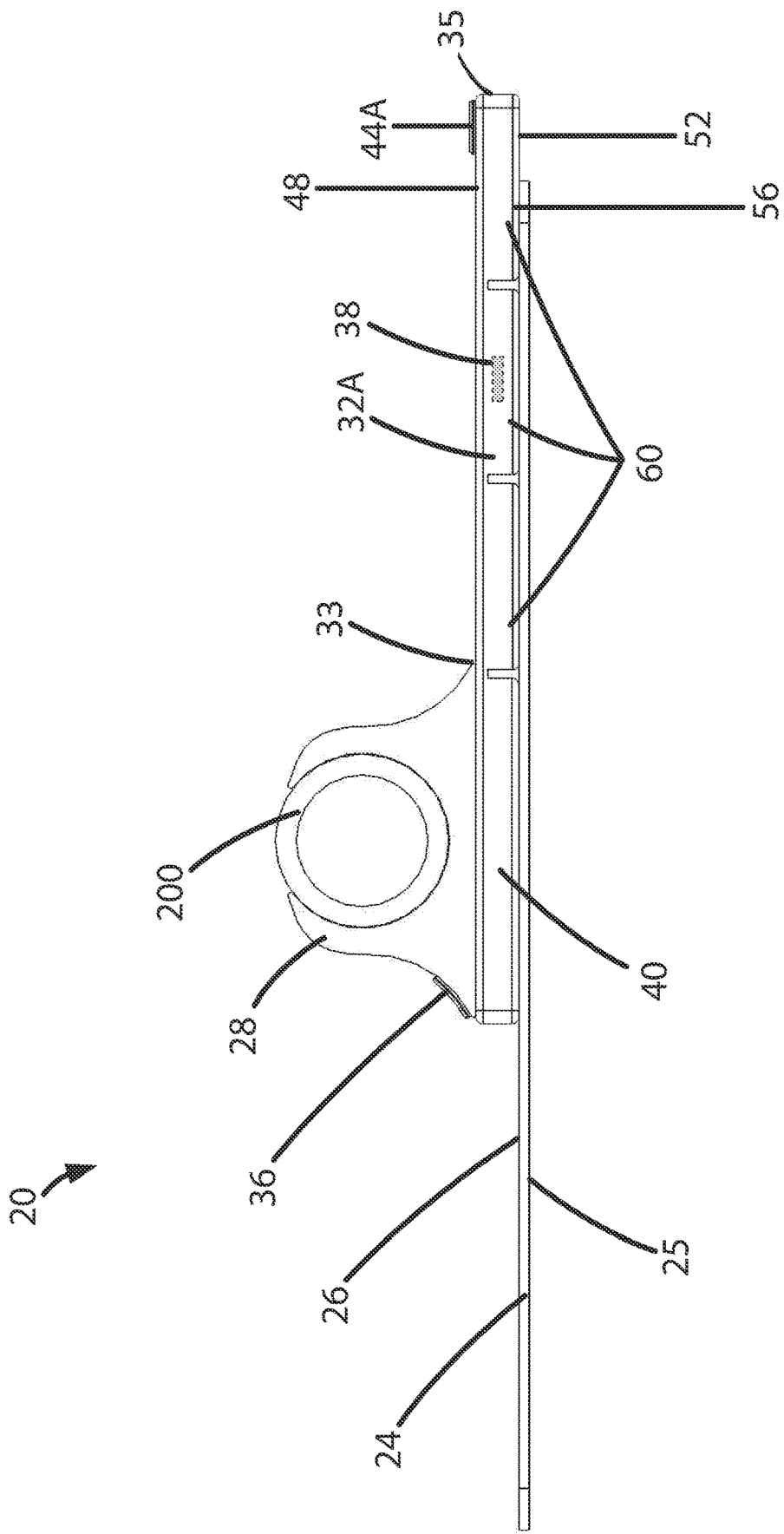
FIG. 4 is a side view of the warming system of FIG. 1, in accordance with various embodiments.

The positioning holder 28 may define a receptacle configured to hold the tube 200 such that the tube 200 remains coupled to the warming system 20 under normal use and operation. In some embodiments, the positioning holder 28 is comprised of a compliant material (e.g., silicone, rubber) and is configured to frictionally grip the tube 200 in use and to release the tube 200 when pulled apart after use. In examples where the positioning holder comprises a plurality of short and discrete holders positioned along base 24, a user may position the tube 200 such that it is gripped by some but not all of the holders during use. In some examples, rather than being gripped by the positioning holder 28, the tube 200 may be free to move relative to the positioning holder 28 but may be held in place by one or more elongate heating fingers 32, as described further below. In certain examples, the positioning holder 28 comprises a material having high heat conductivity and/or high heat capacity. As illustrated in FIG. 4, the positioning holder 28 is C-shaped in cross-section, but this shape may vary.

Each of the plurality of illustrated elongate heating fingers 32 is movably coupled to the base 24, such as to the second side 26 of the base 24. Each elongate heating finger 32 is configured to be independently manipulated (e.g., curved, bent, or otherwise positioned) by a user between various positions relative to the base 24, which are introduced in this paragraph and described further below. In a first or neutral position, the elongate heating finger 32 (e.g., elongate heating fingers 32A and 32B of FIG. 1) is separated from the tube 200. In a second or heating position, the elongate heating finger 32 (e.g., elongate heating finger 32A of FIG. 6) covers or otherwise contacts the tube 200 to transfer heat to the at least one intravenous fluid provided via the tube 200. In this heating position, the elongate heating finger 32A may also hold the tube 200 in place relative to the positioning holder 28. In a third or insulating position, the elongate heating finger 32 (e.g., elongate heating finger 32B of FIG. 6) is at least partially separated or insulated from the tube 200.

Each of the plurality of elongate heating fingers 32 is illustratively elongate in shape and arranged orthogonally to the positioning holder 28. Each elongate heating finger 32 includes a first end 33 movably coupled to the base 24, the insulating layer 40, and/or to the positioning holder 28, a middle portion 34 configured to interact with the tube 200, and a second end 35 removably coupled to the base 24, the insulating layer 40, and/or the positioning holder 28, such as to the securing member 36 on the positioning holder 28.

Figure 7B:
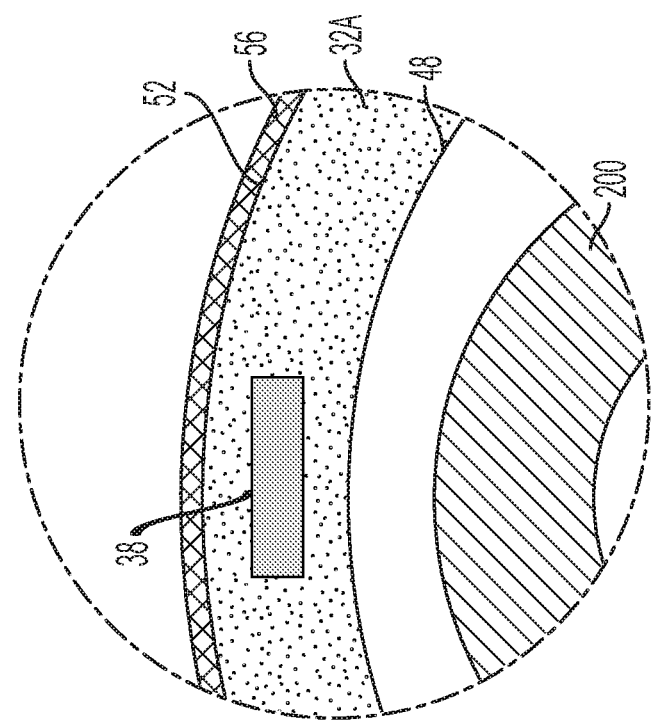
FIG. 7B is a magnified view of the warming system of FIG. 7A, in accordance with various embodiments.
Figure 7A:
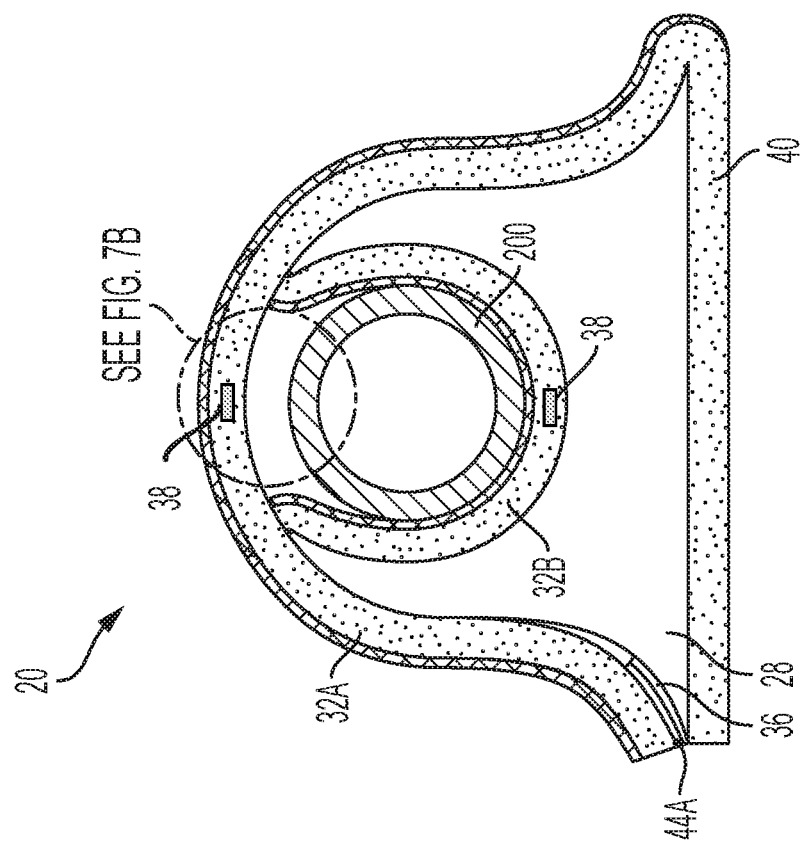
FIG. 7A is a side view of the warming system of FIG. 6, in accordance with various embodiments.

Also, each of the plurality of elongate heating fingers 32 includes at least one heat source 38, as shown in FIGS. 4, 7A, and 7B. Heat source 38 may be larger or smaller than illustrated. For example, in some embodiments, one or more heat sources 38 may fill a significant portion, all, or substantially all, of the interior volume of heating finger 32. In certain embodiments, the heat source 38 is an exothermic composition capable of reacting with air or crystallizing to produce heat. In the air-activated embodiment, the exothermic composition may include a water-retainer (e.g., vermiculite, wood flour, absorbing gelling material), iron powder, and carbon (e.g., activated powder) that react to produce iron oxide in the presence of oxygen. Such air-activated elongate heating fingers 32 may be single-use and disposable. In the crystallizing embodiment, the exothermic composition may include a supersaturated solution, such as one containing sodium acetate, and a nucleation site, such as a metal strip. Such crystallizing elongate heating fingers 32 may be reusable by re-saturating the solution. These exothermic reactions may be initiated manually and without the need for a battery or other power source. In certain examples, each of the plurality of elongate heating fingers 32 includes one or more heating segments 60 (see FIG. 4) or pockets, with each segment 60 containing a heat source 38. For example, each of the one or more heating segments 60 contains the exothermic composition and may have substantially the same dimensions. The one or more heating segments 60 of each elongate heating finger 32 may be positioned side-by-side and orthogonally to the positioning holder 28. In other examples, the heat source 38 is an electronic heating element capable of producing heat. For example, the electronic heating element may be a resistive material (e.g., a copper wire) coupled to an energy source and activatable via a switch. The energy source can include a rechargeable battery, a single-use battery, a power outlet, a generator, and/or an external battery pack. The plurality of elongate heating fingers 32 may be configured such that, even when multiple elongate heating fingers 32 are used in combination, the intravenous fluid flowing through the tube 200 is heated to a maximum temperature, which may be equal to or less than the human body temperature (e.g., 98.6° F.). For example, the exothermic composition in the plurality of elongate heating fingers 32 may be configured to reach and not exceed the maximum temperature. In another example, the electronic heating element may be coupled to a limit-switch which is configured to automatically terminate heating once the maximum temperature is sensed.

As illustrated in FIGS. 1-5, the plurality of elongate heating fingers 32 includes at least a first elongate heating finger 32A and a second elongate heating finger 32B, which may be considerably similar or identical to the first elongate heating finger 32A in materials and dimensions. The first elongate heating finger 32A may be positioned near a first end 29 of the positioning holder 28 and the second elongate heating finger 32B may be positioned near a second end 30 of the positioning holder 28. One or more additional elongate heating fingers 32, illustratively three additional elongate heating fingers 32, may be positioned between the first and second elongate heating fingers 32A, 32B. During use, the tube 200 may deliver the at least one intravenous fluid from the second end 30 to the first end 29 of the positioning holder 28, or vice versa. In some examples, the plurality of elongate heating fingers 32 is positioned substantially parallel with each other. The plurality of elongate heating fingers 32 may be positioned uniformly (e.g., side-by-side) across the warming system 20, such as across the length of the base 24 and orthogonal to the positioning holder 28 and the tube 200 located therein.

The elongate heating fingers 32 are shown in the neutral position in FIGS. 1-5. In this neutral position, the elongate heating finger 32 is disposed entirely on a first or right side 31 of the positioning holder 28 and away from the tube 200. Each of the plurality of elongate heating fingers 32 may include a first side 48 and a second side 52. In the neutral position, the first side 48 of the elongate heating finger 32 may face upward, whereas the second side 52 of the elongate heating finger 32 may face downward and be in contact with the second side 26 of the base 24 (FIG. 4). The separation between the elongate heating finger 32 and the positioning holder 28 in the neutral position leaves the positioning holder 28 exposed to accommodate insertion or removal of the tube 200. It is also within the scope of the present disclosure for the elongate heating fingers 32 to be separated entirely from the base 24 in the neutral position, as described below.

Figure 6:
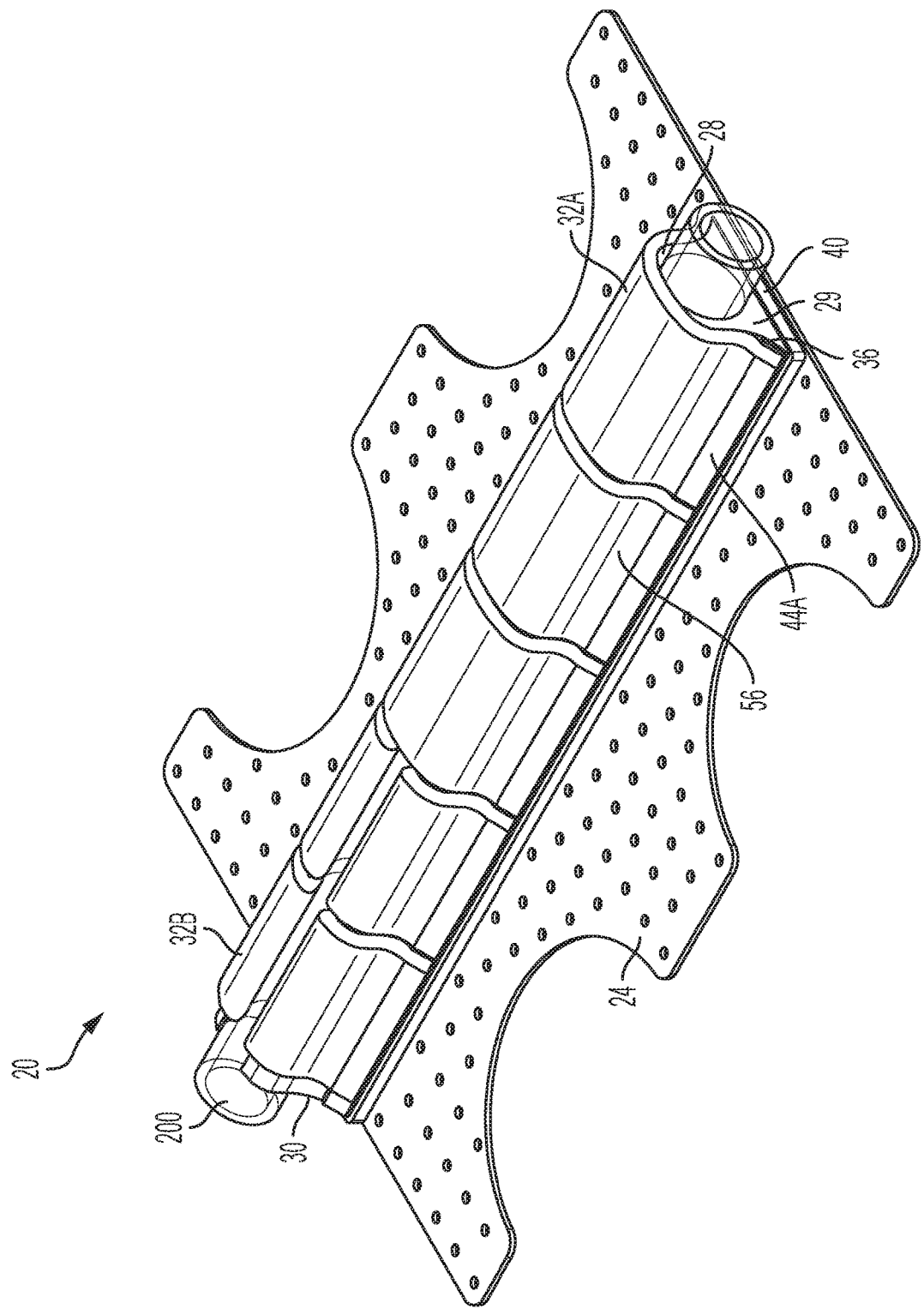
FIG. 6 is a perspective view of the warming system of FIG. 1 in a second configuration, in accordance with various embodiments.

The plurality of elongate heating fingers 32 may be individually manipulated to provide different locations and amounts of heat to the at least one intravenous fluid provided by the tube 200. In FIG. 6, the elongate heating finger 32A is oriented in the heating position above the tube 200 and the positioning holder 28, whereas the elongate heating finger 32B is oriented in the insulating position between the tube 200 and the positioning holder 28. FIGS. 7A-7B show the warming system of FIG. 6. In some embodiments, each of the plurality of elongate heating fingers 32 includes an insulation 56 (e.g., foam or heat reflective material) disposed on the second side 52 of the elongate heating finger 32 and configured to reduce heat transfer from the second side 52 of the elongate heating finger 32, either to the surrounding environment when the insulation 56 is exposed in the heating position (e.g., elongate heating finger 32A) or to the tube 200 when the insulation 56 is tucked beneath the tube 200 in the insulating position (e.g., elongate heating finger 32B). By contrast, the first side 48 of each elongate heating finger 32 may be less insulated than the second side 52 and configured to transfer more heat from the first side 48, either to the tube 200 in the heating position (e.g., elongate heating finger 32A) or to the underlying positioning holder 28 and insulating layer 40 in the insulating position (e.g., elongate heating finger 32B). As such, elongate heating finger 32A in the heating position, with its less-insulated first side 48 contacting the tube 200, is configured to deliver more heat to the tube 200 when compared to elongate heating finger 32B in the insulating position, with its more-insulated second side 52 contacting the tube 200.

The illustrated securing member 36 is disposed on the second side 26 of the base 24 and is configured to secure one or more elongate heating fingers 32 across the positioning holder 28 in the desired heating and/or insulating positions. The securing member 36 may include a Velcro strip, a button (e.g., snap button), a hook/loop, or a latch. The securing member 36 may be comprised of metal or plastic. As illustrated, the securing member 36 is disposed on or near the positioning holder 28 and opposite the first side 31 of the base 24. In some examples, each of the plurality of elongate heating fingers 32 includes a securing element 44 disposed at or near its second end 35 and on the first side 48. For example, the first elongate heating finger 32A includes a first securing element 44A disposed on the first side 48 near its second end 35, and the second elongate heating finger 32B includes a securing element 44B disposed on the first side 48 near its second end 35. In certain examples, the securing element 44 and the securing member 36 are configured to releasably couple the second ends 35 of the one or more manipulated elongate heating fingers 32 to the base 24 and/or the positioning holder 28 such that the one or more manipulated elongate heating fingers 32 may remain in place during use. In various embodiments, the securing element 44 and the securing member 36 may be a male-female pair of Velcro®. For example, the securing element 44 may include loops and the securing member 36 may include hooks, or vice versa. It is also within the scope of the present disclosure for the first end 33 of each elongate heating finger 32 to be removably coupled to the base 24 and/or the positioning holder 28, such as using a second securing member 44A' near the first end 33 and a corresponding second securing member 36' on or near the positioning holder 28. Thus, each elongate heating fingers 32 may be partially removable from the base at its first end 33 or its second end 35 or completely removable from the base at both ends 33 and 35.

The illustrated insulating layer 40 is disposed between the positioning holder 28 and the base 24. The insulating layer 40 may be comprised of a thermally insulating material (e.g., foam) that is configured to limit heat transfer between the underlying surface (e.g., the patient's skin) and the overlying elongate heating fingers 32 and tube 200. The insulating layer 40 may also serve as a cushioning element to improve patient comfort.

To achieve a target fluid temperature in the tube 200, the location and amount of heat transferred from the warming system 20 to the tube 200 may be controlled by varying the position of each individual elongate heating finger 32 (i.e., neutral, heating, or insulating position). In FIG. 1, the warming system is shown in a neutral configuration with all five elongate heating fingers 32 spaced apart from the tube 200 in their neutral positions for little or no heating of the tube 200. This neutral configuration may also accommodate insertion or removal of the tube 200. In FIG. 6, the warming system 20 is shown in a moderate-heat configuration with three elongate heating fingers 32 (including elongate heating finger 32A) in their heating positions and two elongate heating fingers (including elongate heating finger 32B) in their insulating positions for moderate heating of the tube 200. Warming system 20 may have any number of other heating configurations. For example, a high-heat configuration may be achieved with more elongate heating fingers 32 in their heating positions for more heating of the tube 200, and a low-heat configuration may be achieved with fewer elongate heating fingers 32 in their heating positions for less heating of the tube 200. When not in their heating positions, the elongate heating fingers 32 may be left in their neutral positions (FIG. 1) for little or no heating of the tube 200 or in their insulating positions (FIG. 6) for limited heating of the tube 200.

The target fluid temperature may vary over time and from patient to patient. Thus, the healthcare provider may easily adjust the heating configuration of the warming system 20 over time and from patient to patient. It is to be understood that both re-usable and single-use warming systems are contemplated. For example, a re-usable warming system may generate heat using electrical power or be configured to include swappable exothermic chemical packs in the heating fingers 32. Even in the single-use context, the ability to adjust the target fluid temperature for each patient using identical warming systems 20 may simplify manufacturing and inventory.

The target fluid temperature may also be reached by controlling other system variables. For example, the target fluid temperature may be reached by modifying the exothermic compositions in the elongate heating fingers 32, adjusting the resistance of the resistive heating elements, adjusting the arrangement of the resistive heating elements, adjusting heating parameters for the electrical heating elements, the number of elongate heating fingers 32, the flow rate of fluid flowing through the tube 200, and other variables.

Figure 8:
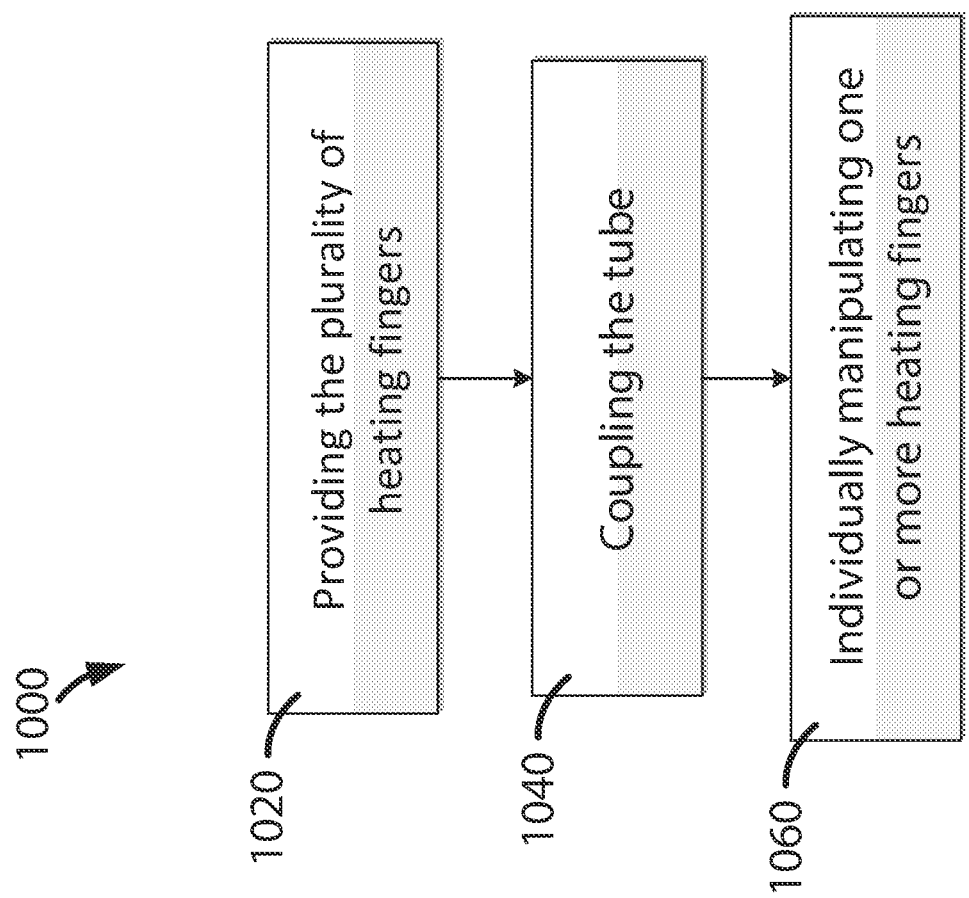
FIG. 8 is an illustrated method of warming a fluid, in accordance with various embodiments.

FIG. 8 is an illustrated method 1000 of warming a fluid, in accordance with various embodiments. In some examples, the method 1000 includes step 1020 for providing a plurality of elongate heating fingers, step 1040 for coupling a tube, and step 1060 for individually manipulating one or more elongate heating fingers.

In certain embodiments, step 1020 includes providing a plurality of elongate heating fingers (e.g., the plurality of elongate heating fingers 32). For example, providing the plurality of elongate heating fingers may include initiating exothermic reactions in one or more of the plurality of elongate heating fingers to produce heat, such as by exposing reactants in the fingers to air to initiate one or more exothermic chemical reactions. In yet another example, providing the plurality of elongate heating fingers may include initiating resistive heating in one or more of the plurality of elongate heating fingers to produce heat, such as by switching on a power source to supply current to electrical heating elements in the fingers.

In certain embodiments, step 1040 includes coupling a tube (e.g., tube 200) to a warming system (e.g., warming system 20), such as to a positioning holder (e.g., positioning holder 28) of the warming system.

In certain embodiments, step 1060 includes individually manipulating one or more elongate heating fingers of the plurality of elongate heating fingers such that the manipulated one or more elongate heating fingers contact (e.g., cover) the tube to heat the tube. In various embodiments, the manipulating step 1060 includes positioning one or more elongate heating fingers in their heating positions with the less-insulated first sides (e.g., first side 48) of the one or more elongate heating fingers (e.g., elongate heating finger 32A) adjacent to or in contact with the tube and/or in their insulating positions with the more-insulated second sides (e.g., second side 52) of the one or more elongate heating fingers (e.g., elongate heating finger 32B) adjacent to or in contact with the tube. In certain examples, the one or more elongate heating fingers that are manipulated are selected to achieve a desired heating configuration (e.g., low-heat, moderate-heat, or high-heat configurations) based on a target temperature of at least one fluid provided by the tube. In some examples, the method 1000 further includes a step for securing (e.g., removably) the one or more individually manipulated elongate heating fingers to at least one securing members (e.g., securing member 36).

The order of the above steps may vary. For example, it is within the scope of the present disclosure to perform the coupling step 1040 before the initiating step 1020.

While embodiments of the invention have been described as having exemplary designs, the embodiments of the present disclosure may be further modified within the spirit and scope of this disclosure. This application is therefore intended to cover any variations, uses, or adaptations of the disclosed embodiments using its general principles.

What is claimed is:

1. A system for warming intravenous fluids for delivery to a patient, the system comprising:
   a base having a first side and a second side;
   a positioning holder disposed on the second side and configured to receive and support a tube for providing at least one intravenous fluid to a patient; and
   a plurality of elongate heating fingers disposed on the second side, wherein each elongate heating finger of the plurality of elongate heating fingers is configured to be independently manipulated such that said elongate heating finger contacts the tube to transfer heat to the at least one intravenous fluid provided via the tube.

2. The system of claim 1, wherein each of the plurality of elongate heating fingers includes an exothermic composition capable of reacting with air or crystallizing to produce heat.

3. The system of claim 1, wherein each of the plurality of elongate heating fingers includes an electronic heating element capable of producing heat.

4. The system of claim 1, further comprising at least one securing member disposed on the second side and configured to secure one or more manipulated elongate heating fingers of the plurality of elongate heating fingers.

5. The system of claim 4, wherein the at least one securing members are comprised of Velcro.

6. The system of claim 1, further comprising an insulating layer disposed between the positioning holder and the base.

7. The system of claim 1, wherein the base is air-permeable.

8. The system of claim 1, wherein the base is stretchable to allow the base to conform to a mounting surface.

9. The system of claim 1, wherein the positioning holder extends along a length of the base.

10. The system of claim 1, wherein the positioning holder is comprised of a compliant material.

11. The system of claim 1, wherein the base is configured for removable attachment to the patient.

12. The system of claim 1, wherein the at least one intravenous fluid includes at least one drug.

13. A system for warming intravenous fluids for delivery to a patient, the system comprising:
   a base configured to removably secure a tube for providing at least one intravenous fluid to the patient;
   a first elongate heating finger movably coupled to the base; and
   a second elongate heating finger movably coupled to the base;
   wherein the system has:
      a neutral configuration in which the first and second elongate heating fingers are separated from the tube;
      a low-heat configuration in which the first elongate heating finger contacts the tube and the second elongate heating finger is separated or insulated from the tube; and
      a high-heat configuration in which the first and second elongate heating fingers contact the tube.

14. The system of claim 13, wherein each of the first and second elongate heating fingers includes a first end permanently coupled to the base, a middle portion configured to contact the tube, and a second end removably coupled to the base.

15. The system of claim 13, wherein the base is configured for removable attachment to the patient.

16. The system of claim 13, wherein each of the first elongate heating finger and the second elongate heating finger has a first side and a second side and includes an insulation disposed on the second side for reducing heat transfer from the elongate heating finger to the tube when the insulation is positioned between the elongate heating finger and the tube.

17. The system of claim 16, wherein in the low-heat configuration, the first elongate heating finger is in a heating position with the first side of the first elongate heating finger contacting the tube and the second elongate heating finger is in an insulating position with the insulation on the second side of the second elongate heating finger contacting the tube.

18. The system of claim 16, wherein in the high-heat configuration, the first and second elongate heating fingers are in heating positions with the first sides of the first and second elongate heating fingers contacting the tube.

19. The system of claim 13, wherein the at least one intravenous fluid comprises a drug.

20. A method of warming at least one fluid provided intravenously to a patient via a tube using a system including a base, a positioning holder, a plurality of elongate heating fingers, and at least one securing member, the method comprising:
    providing the plurality of elongate heating fingers;
    coupling the tube to the positioning holder; and
    individually manipulating one or more of the plurality of elongate heating fingers one at a time to contact the tube based on a target temperature of the at least one fluid.

21. The method of claim 20, further comprising securing the one or more individually manipulated elongate heating fingers to the at least one securing members.

22. The method of claim 20, wherein individually manipulating one or more of the plurality of elongate heating fingers includes establishing a low-heat configuration by manipulating a first elongate heating finger of the plurality of elongate heating fingers into a heating position with a first side of the first elongate heating finger contacting the tube and manipulating a second elongate heating finger of the plurality of elongate heating fingers into an insulating position with an insulation disposed on a second side of the second elongate heating finger contacting the tube.

23. The method of claim 20, wherein individually manipulating one or more of the plurality of elongate heating fingers includes establishing a high-heat configuration by manipulating a first elongate heating finger and a second elongate heating finger of the plurality of elongate heating fingers into heating positions with a first side of the first elongate heating finger contacting the tube and a first side of the second elongate heating finger contacting the tube.

24. The method of claim 20, wherein providing the plurality of elongate heating fingers includes initiating exothermic reactions in one or more of the plurality of elongate heating fingers to produce heat.

25. The method of claim 20, wherein providing the plurality of elongate heating fingers includes initiating resistive heating in one or more of the plurality of elongate heating fingers to produce heat.

26. The method of claim 20, wherein the at least one fluid comprises a drug.

* * * * *